United States Patent [19]

Noguchi et al.

[11] Patent Number: 5,418,056
[45] Date of Patent: May 23, 1995

[54] POLYMER COMPOSITE WITH DISPERSED FINE GRAINS AND A METHOD FOR MANUFACTURING THE SAME

[75] Inventors: Toru Noguchi, Fukaehonmachi; Kazuo Goto, Amagasaki; Yoshio Yamaguchi, Hyogo; Hajime Kakiuchi, Itami; Shigehito Deki, Hyogo all of Japan

[73] Assignee: Mitsuboshi Belting Ltd., Kobe, Japan

[21] Appl. No.: 616,901

[22] Filed: Nov. 21, 1990

[30] Foreign Application Priority Data

Nov. 24, 1989 [JP] Japan .................... 1-305752
Oct. 5, 1990 [JP] Japan .................... 2-268709

[51] Int. Cl.$^6$ ............ B28B 11/06; B05D 3/02; B32B 5/16
[52] U.S. Cl. ............ 428/323; 264/131; 264/134; 264/235; 264/346; 427/189; 427/190; 427/191; 427/192; 427/195; 427/201; 427/202; 427/205; 427/248.1; 427/250; 427/296; 428/328; 428/329
[58] Field of Search ............ 428/323, 328, 329, 458, 428/475.5, 462; 427/201, 202, 205, 189, 195, 248.1, 250, 296, 446, 453, 566, 190, 191, 192; 264/131, 134, 235, 346, 348

[56] References Cited

U.S. PATENT DOCUMENTS

| | | | |
|---|---|---|---|
| 2,947,646 | 8/1960 | Devaney et al. | 106/193 |
| 3,082,109 | 3/1963 | Devaney et al. | 106/193 |
| 4,025,665 | 5/1977 | Hannon | 427/192 |
| 4,457,973 | 7/1984 | Matsui et al. | 428/372 |
| 4,615,903 | 10/1986 | Miller | 427/26 |
| 4,654,229 | 5/1987 | Morita et al. | 427/100 |
| 4,714,631 | 12/1987 | Aufderheide | 427/250 |
| 4,720,401 | 1/1988 | Ho et al. | 427/250 |
| 4,889,746 | 12/1989 | Utsumi et al. | 427/162 |
| 4,983,456 | 1/1991 | Iwaskow et al. | 428/254 |

FOREIGN PATENT DOCUMENTS

| | | |
|---|---|---|
| 0125617 | 5/1984 | European Pat. Off. . |
| 0318196 | 11/1988 | European Pat. Off. . |
| 144029 | 11/1980 | Japan . |
| 1024832 | 1/1989 | Japan . |
| 314781 | 7/1969 | U.S.S.R. . |
| WO90/11890 | 10/1990 | WIPO . |

OTHER PUBLICATIONS

"Organic Films COntaining Metal Prepared By Plasma Polymerization" by K. Kashiwagi, et al., J. Vac. Sci. Technol. A5(4), Jul./Aug. 1987. pp. 1828–1830.

*Primary Examiner*—D. S. Nakarani
*Assistant Examiner*—H. Thi Le
*Attorney, Agent, or Firm*—Wood, Phillips, VanSanten, Clark & Mortimer

[57] ABSTRACT

A polymer composite includes a thermoplastic plastic polymer having a fine grain metal or metal oxide dispersed therein. Preferably, the fine grains has a size of about 1,000 nm or less. A method of making the polymer composite by adhering a metal layer to a thermoplastic polymer layer in a thermodynamically nonequilibrated condition followed by relaxation of the polymer layer to obtain thermodynamic equilibrium which causes the metal layer to be absorbed by the polymer layer as fine grains is also disclosed.

19 Claims, 4 Drawing Sheets

POLYMER COMPOSITE WITH DISPERSED FINE GRAINS AND A METHOD FOR MANUFACTURING THE SAME

TECHNICAL FIELD

This invention relates to a polymer composite with fine grains dispersed therein and a method for manufacturing the composite. More particularly, this invention relates to a polymer composite containing fine grains of a metal or metal oxide having a size of about 1,000 nm or less and a method for manufacturing the composite.

BACKGROUND OF THE INVENTION

Presently, various functional polymers with conductivity have been developed, including a group of polymers utilizing $\pi$ conjugated electrons. These polymers are represented by phosphorus-paraphenylene, phosphorus-paraphenylenevinylene, phosphorus-thiophene, phosphorus-aniline, phosphorus-pyrrole, and the like and are known to have a conductivity ranging from 1 to $1 \times 10^5$ Siemens per centimeter (S/cm), which is approximately equal to the conductivity of metals.

However, once conjugated bonds have been formed, the above-mentioned conductive polymers become insoluble even in a solvent and therefore are very difficult to process by molding. The polymers are difficult to process into thin film, film, wire, and the like. Also, these polymers experience a decline of conductivity induced when they are left in the air for many hours.

Another polymer material having a polymer matrix packed with such conductors of metal fine grains such as metal powder, metal fiber, carbon black, and the like only has a conductivity of $1 \times 10^{-4}$ to 1 S/cm. In the polymer material, conductivity is ensured because the conductors are in contact with each other. Unfortunately, the degree of the contact varies greatly in the matrix which results in resistance distribution.

Since metal fine grains permit most of their atoms to be used to form a surface and they have a large proportion of atoms exposed on the surface, it is known that they are highly active physically as well as chemically and have markedly different properties from bulk metals that are not fine grains. Also because of the huge surface areas that these polymer materials possess, which are caused by the metal fine grains, these polymer materials have been conventionally attempted to be used for catalysts, heat exchange system, specific conduction material, magnetic material, photoelectric conversion material, vital material, drug material, and the like.

Due to their high reactivity, the metallic fine grains are difficult to handle; for example, they are readily ignited, exploded or they themselves are resintered, aggregated, or make their sizes varied. In addition, they also change in physical and chemical properties which leads to very few industrial application.

SUMMARY OF THE INVENTION

The present invention is directed to a polymer composite including a thermoplastic polymer and fine grains of at least one metal or metal oxide dispersed and separated within the thermoplastic polymer. The fine grains have a grain size of about 1,000 nanometers (nm) or less. The present invention is also directed to a method of manufacturing the polymer composite that includes the steps of providing a ground, forming a layer of a thermoplastic polymer in a thermodynamically nonequilibrated state on the ground, applying a metal layer to the surface of the polymer layer and relaxing the polymer layer to achieve thermodynamic equilibrium of the polymer layer which causes fine grains of the metal layer to be dispersed in the polymer layer. The polymer layer can be formed by vacuum evaporation on or by melting the polymer followed by rapid cooling and solidification.

As a result that the present inventors paid attention to the foregoing problems and did their utmost to obtain a stable and highly conductive polymer material, they have found the unique phenomena that the metallic conductors penetrate naturally into a polymer in a state of fine grains with a size of about 1,000 nm or less without being sparingly packed in the polymer and that these fine grains are quite stably dispersed independently from one after another, thus arriving at this invention. The density of the fine grains in the polymer layer of the composite contributes to the desired results.

A polymer composite, which can also be referred to as a polymer complex, of this invention has the fine grains of a metal or metal oxide dispersed therein. Said fine grains are dispersed in a state of separation from each other in the polymer layer, possessing an excellent conductivity even in this dispersed condition. In addition, even though the fine grains of the metal or metal oxide present in the polymer layer are small in volume, the polymer composite exhibits a sufficient conductivity, is applicable as a bonding material and possesses photoelectric effect.

Moreover, in a method for manufacturing a polymer composite with the above-mentioned fine grains dispersed therein, after a polymer is melted, the resulting material is cooled rapidly and solidified, thus forming a thermodynamically nonequilibrated polymer layer. With the equilibration, that is, relaxation of said polymer layer, a metal layer provided on the surface of said layer can be diffused and penetrated into the polymer layer and can also be dispersed homogeneously in a highly physically and chemically stable state without causing the ignition, explosion or resintering of the fine grains. In addition, this composite exhibits chemical and physical stability over time, less resistance distribution and, moreover, has the effect that the polymer layer can be readily formed into thin film, film, wire material, and the like.

DETAILED DESCRIPTION OF THE PREFERRED EMBODIMENTS

A polymer composite of the present invention has fine grains dispersed therein. The fine grains have a size of 1,000 nanometers (nm) or less and are selected from a group consisting of metals or metal oxides and are dispersed independently from each other. A method for manufacturing a polymer composite with fine grains dispersed in accordance with this invention includes the following steps: melting a polymer material; rapidly solidifying the melted polymer to form a thermodynamically nonequilibrated polymer layer; providing a metal film stuck onto the surface of this polymer layer; and relaxing the polymer layer until it reaches equilibrium which results in metal or metal oxide fine-grains from said metal layer penetrating and dispersing in the polymer layer. Alternatively, the thermodynamically nonequilibrated polymer layer can be produced by vacuum evaporation.

The fine grains dispersed in the polymer can be present in an amount in the range of about 0.1 to about 80 volume percent.

The steps of the method in accordance with this invention are described in more detail in conjunction with FIGS. 1 to 4.

Figure 1:
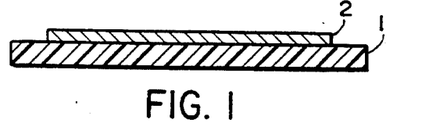
FIG. 1 is a longitudinal cross-sectional view showing a polymer layer formed on a ground.

(1) As shown in FIG. 1, the first step is to form a polymer layer in a thermodynamically nonequilibrated state; this step can be accomplished using, e.g., a vacuum evaporation method or a melting and rapid solidification method.

The vacuum evaporation method that is exemplified by heating a polymer material in a vacuum for melting and evaporation and then solidifying said polymer layer 2 on a ground 1. With the vacuum evaporation method, using a known vacuum evaporator, a polymer layer can be obtained on a ground such as glass or the like at the vacuum of $1\times10^{-4}$ to $1\times10^{-6}$ Torr and the evaporation speed of 0.1 to 100 micrometers/minute (μm/min), preferably 0.5 to 5 μm/min.

The melting and rapid solidification method is exemplified by melting a polymer material at a temperature above the temperature of melting and immediately putting the material into a bath of liquid nitrogen or the like in the molten state for rapid cooling and then solidifying. Within the bath is ground 1, i.e., a substrate upon which the polymer layer 2 solidifies. In the melting and rapid solidification method the polymer material is melted and cooled at a cooling rate above the critical cooling temperature peculiar to the polymer material, and is then put in, for example, liquid nitrogen, to obtain the polymer layer.

The polymer layer 2 thus obtained is formed on the ground 1 in a thermodynamically nonequilibrium state and changes to a thermodynamically equilibrium state over time.

The polymer material used herein is a conventional thermoplastic polymer, for example, nylon 6, nylon 66, nylon 11, nylon 12, nylon 69, high density polyethylenes (HDPE), low density polyethylenes (LPDE), poly(vinylidene fluorides) (PVDF), poly(vinyl chlorides), and polyoxymethylenes.

Figure 2:
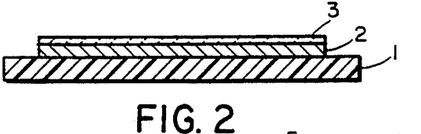
FIG. 2 is a longitudinal cross-sectional view showing a metal layer stuck onto a polymer layer.

(2) Next, as shown in FIG. 2, the polymer layer 2 in a thermodynamically nonequilibrium state has a metal layer 3 stuck onto the surface of said polymer layer 2. In this step, the metal layer 3 is laid on the polymer layer 2 by evaporating the metal layer 3 to the polymer layer 2 using the above-mentioned vacuum evaporator or by sticking metal foil or plate directly onto the solidified polymer layer 2. Representative metal materials include gold, silver, platinum, copper, iron, zinc, cerium, their oxides and the like.

Figure 3:
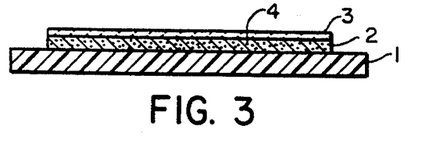
FIG. 3 is a longitudinal cross-sectional view showing a polymer layer with a metal layer after heating.

(3) The polymer layer 2 is brought into an equilibrium state by heating to a temperature between the glass transition temperature and the melting temperature of the polymer or leaving naturally. In this step, it is preferable to keep the polymer layer with the adhered metal layer at a temperature below the melting temperature of the polymer material in an isothermal water bath and thus promote its state of relaxation. As a result, the metal of the metal layer 3, as shown in FIG. 3, becomes the fine grains 4 of the metal or metal oxide that diffuse and penetrate into the polymer layer 2. The fine grains 4 have a grain size of about 1,000 nm or less, preferably about 300 nm or less, and more preferably about 100 nm or less. This state of diffusion and penetration continues until the polymer layer 2 is completely relaxed, and the metal layer 3 adhering to the polymer layer 2 is reduced in its thickness and, preferably, finally disappears. (See FIGS. 3 and 4). Accordingly, it is preferable to adjust the thickness of the metal layer 3 in order that the metal layer entirely becomes the fine grains 4 of the metal or metal oxide and its totally dispersed in the polymer layer 2.

Said fine grains 4 include the above-mentioned metals, and their oxides such as $Cu_2O$, $Fe_3O_4$ and ZnO.

Furthermore, when the polymer layer 2 is heated in this step, it is seen that the polymer layer 2 assumes its inherent color due to its interaction with the metal or metal oxide and that the fine grains 4 of the metal or metal oxide have penetrated into the polymer layer 2. In addition, the color can vary depending on the kind of metal or metal oxide, the fine grain size of the metal or metal oxide and the type of polymer utilized.

Figure 4:
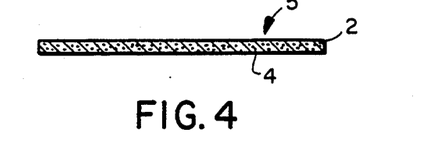
FIG. 4 is a longitudinal cross-sectional view of a present polymer composite obtained by a method in accordance with this invention.

As shown in FIG. 4, a polymer composite 5 with the fine grains of the metal or metal oxide obtained in the above manner has the fine grains 4 separated and dispersed in an independent state. In other words, the polymer composite 5 has good conductivity despite the fact that the fine grains of the metal or metal oxide are not in contact with each other and are present in a relatively small amount. In addition, since the fine grains 4 of the metal or metal oxide are dispersed stably in the polymer layer 2, the polymer composite 5 in accordance with this invention has superior acid resistance, maintains stable physical property values such as conductivity, and possesses an excellent stability over time.

The polymer composite 5 can be a conductive polymer or a conductive paste, with these fine grains dispersed therein.

The polymer composite has the extremely large catalytic activity of a fine-grained metal and also takes a form in which the fine grains of the metal or metal oxide are covered with a polymer. It can be utilized in the following ways: stably maintained catalyst; magnetic memory in which a mass storage can be expected because of a fine-grained metal or metal oxide; light or heat response material utilizing the changes in the structure and distance between a polymer and the above-mentioned fine grains caused by stimulation of light or heat; optical material such as liquid crystal color display material due to the presentation of clear and inherent colors by proper selection of the types of polymer and metal; sintering accelerator and bonding material utilizing a decline in the sintering temperature of a powdered metal caused by the fine grains of the metal; heat exchange film due to a composite of a polymer and the fine grains of a metal or metal oxide utilizing the large specific heat capacity of the fine grains; bulk condenser material; and various gas sensors.

Next, EXAMPLES of the present invention will be described in further detail with reference to its embodiments. These EXAMPLES are presented by way of illustration, and not limitation.

EXAMPLE 1

A first sample was prepared with a vacuum evaporator into which a predetermined polymer pellet was put into a tungsten board, followed by a reduction of pressure to $1 \times 10^{-6}$ Torr. Then, the tungsten board was heated under vacuum with the inter-electrode application of a voltage to melt the polymer. Thus, a polymer layer, which is an evaporated film with a thickness of about 5 $\mu$m, was produced at a speed of about 1 $\mu$m/min and vacuum level of $1 \times 10^{-4}$ Torr to $1 \times 10^{-6}$ Torr on a ground (a glass sheet) placed on the upper part of a table. The molecular weight of this polymer layer represented about ½ to 1/10 that of the pellet. Then, a gold wire was coiled round the tungsten wire and melted by heating for evaporation in a vacuum of $1 \times 10^{-4}$ to $1 \times 10^{-6}$ Torr, causing a gold evaporated film to be stuck onto the polymer layer. The glass plate with this polymer layer and film stuck thereon was taken out from the vacuum evaporator and maintained for 30 minutes in an isothermal bath kept at 100° C., thus yielding a polymer composite. As a result, the gold color of the film surface disappeared, so that the composite as a whole turned to be clear and red.

Figure 5:
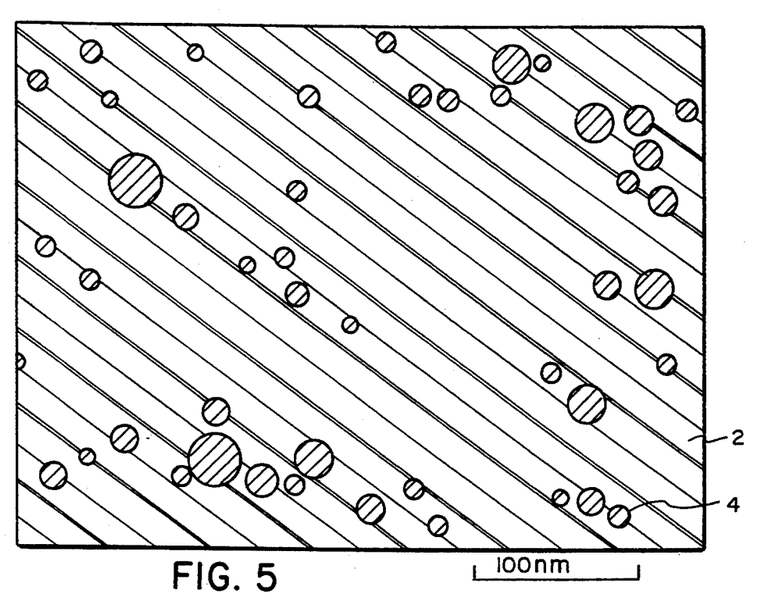
FIG. 5 is a diagram showing the dispersion of gold fine grains depicted from a transmission electron microphotograph of a polymer composite obtained in accordance with EXAMPLE 1.
Figure 6:
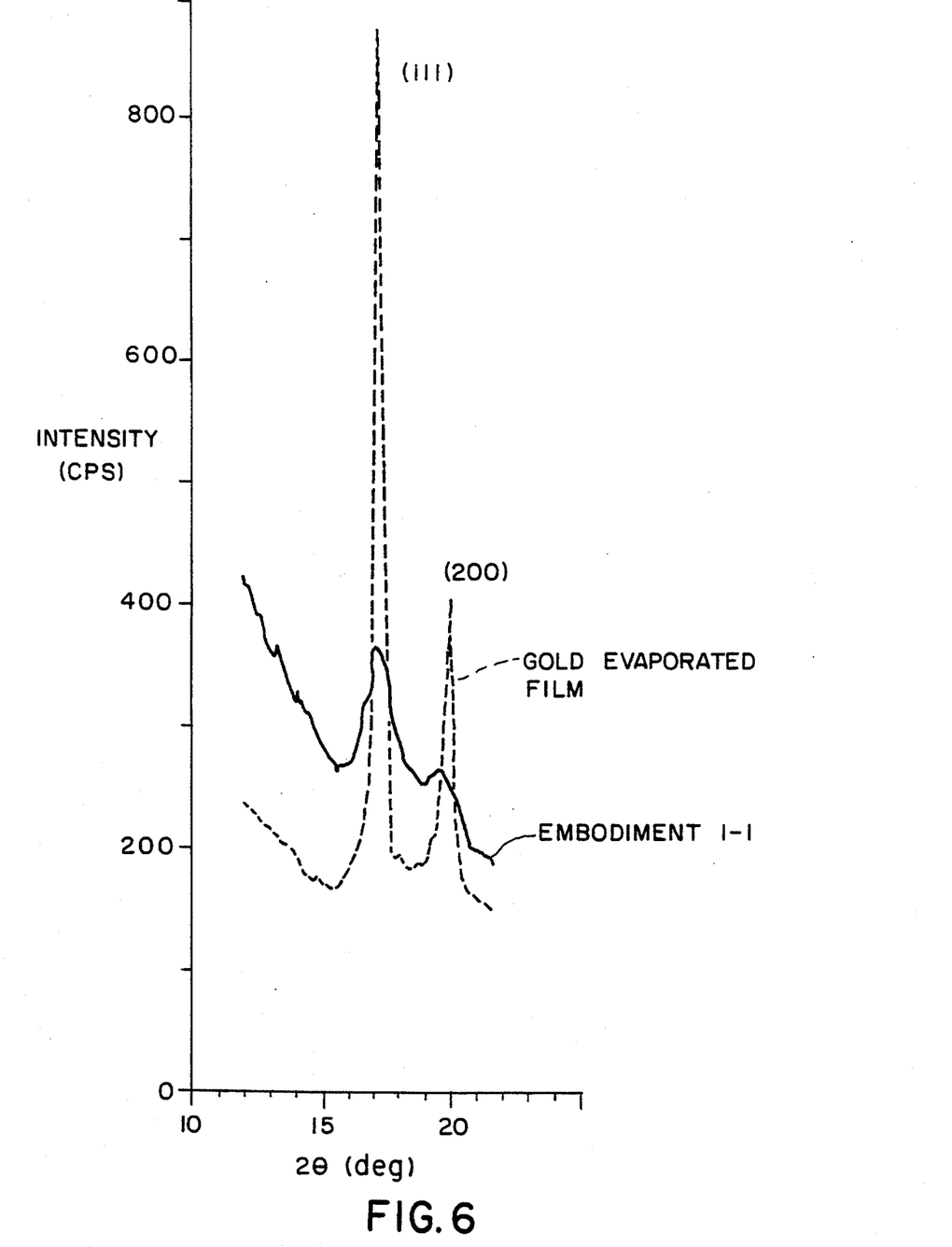
FIG. 6 is an X-ray diffraction pattern diagram of a polymer composite obtained in accordance with EXAMPLE 1.

Furthermore, FIG. 5 shows a state of dispersed gold fine grains 4, which was depicted from a transmission electron microphotograph of a composite using nylon 11 as the polymer layer 2. According to this picture, gold takes the form of fine grains with a size of 1 to 10 nm and is distinctly dispersed in nylon 11. FIG. 6 further shows an X-ray diffraction pattern of said sample, from which it can be seen that a peak of diffraction appears at the same diffraction angle as that of gold evaporated on glass, revealing the same structure as bulk gold, but a large width of the diffraction peak gives evidence that gold became fine grains.

For comparative examples, each polymer pellet was melted at a temperature above its melting temperature and then cooled slowly to form a polymer layer with a thickness of 10 $\mu$m in a thermodynamically equilibrium state. Each layer had gold evaporated thereon, then was taken out from the vacuum evaporator, and was allowed to stand for 30 minutes in an isothermal bath maintained at 100° C. There was no change in either the layer form or the gold color of the film surface. Table 1 presents each sample with reference to the construction, film coloration after heating, and size of gold fine grains measured with the transmission electron microscope.

TABLE 1

|  | Embodiment | | | | Comparative example | | | |
| --- | --- | --- | --- | --- | --- | --- | --- | --- |
|  | 1-1 | 1-2 | 1-3 | 1-4 | 1-1 | 1-2 | 1-3 | 1-4 |
| Polymer | nylon 11 | nylon 12 | PVDF | HDPE | nylon 11 | nylon 12 | PVDF | HDPE |
| Manufacturing method of polymer layer |  | evaporation |  |  |  | slow cooling after melting |  |  |
| Metal | gold | gold | gold | gold | gold | gold | gold | gold |
| Manufacturing method of metal film |  | evaporation |  |  |  | evaporation |  |  |
| Ground | glass | glass | glass | glass | none | none | none | none |
| Color of film after heating | clear and red | clear and red | clear and red | clear and dark red | clear and white | clear and white | clear and white | clear and white |
| Grain size of metal (nm) | 1–10 | 1–10 | 1–10 | 1–100 | — | — | — | — |

(Assessment of conductivity)

Figure 7:
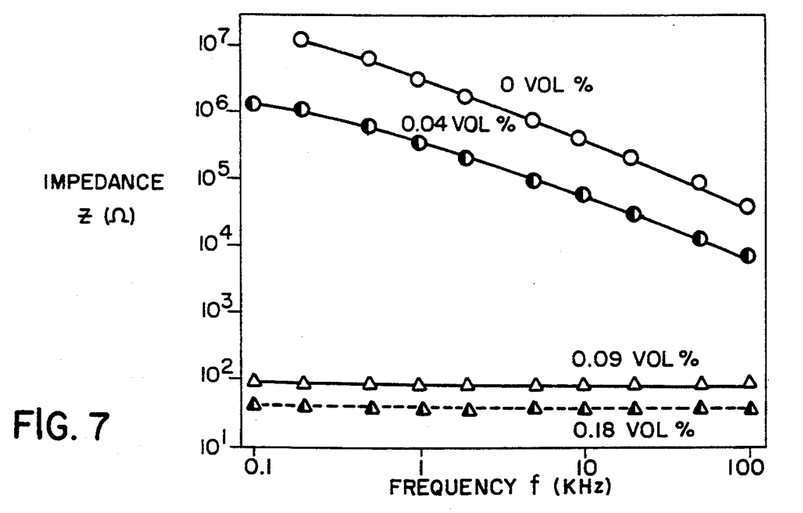
FIG. 7 is a diagram showing the relation between the frequency and impedance Z of a polymer composite obtained in accordance with EXAMPLE 1.
Figures 8, 9:
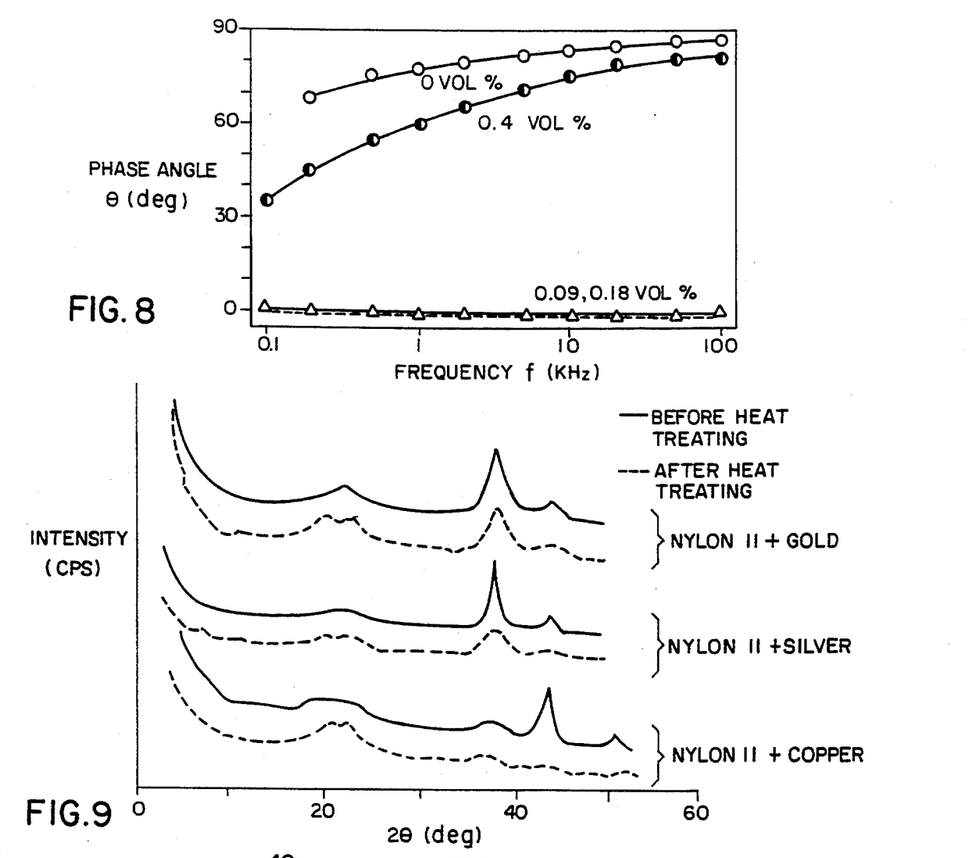
FIG. 8 is a diagram showing the relation between the frequency and phase angle θ of said composite.
FIG. 9 is a thin film X-ray diffraction pattern of a laminate of a polymer layer, metal film as obtained in accordance with the EXAMPLE 2 and a polymer composite.

The conductivity of each of said samples was assessed. First, a laminated film obtained by evaporating nylon 11, then gold to the indium tin oxide (ITO) surface of ITO glass was cut into two halves, stuck together so the gold evaporated film surfaces came into contact with each other, followed by heat treatment at 100° C. for 30 minutes to bond the above two halves. Aluminum foil was fitted to both ITO surfaces by silver paste, and impedance Z and phase angle $\theta$ were measured with an LCR meter. The results are shown in FIGS. 7 and 8. According to these figures, when gold fine grains represent 0.04 vol %, both impedance Z and phase angle $\theta$ are large, whereas if they account for as small as 0.09 vol %, impedance Z ranges from 0.1 to 100 kilohertz (Khz), and phase angle $\theta$ is almost zero. This clarifies that gold fine grains exhibit conductivity despite their dispersion and independence from each other, leading to a presumption that a tunnel current flows between gold fine grains.

EXAMPLE 2

Using the same vacuum evaporator as in EXAMPLE 1, three kinds of samples were produced by laying the polymer layer of nylon 11 with a thickness of about 5 $\mu$m on glass sheets and the evaporation films of gold, silver and copper, respectively, on the polymer layers. These samples were then maintained at 120° C. for 10 minutes in an isothermal bath to obtain the composites of this invention. The vacuum evaporation was preformed at a vacuum level range of $1 \times 10^{-4}$ to $1 \times 10^{-6}$ Torr upon evaporation of the polymer and metal and the evaporation speed of the polymer was 1 μm/min.

For the three kinds of samples thus obtained, their X-ray diffraction patterns were measured with a thin film X-ray diffraction apparatus with an angle of incidence of 0.5° (RINT 1200, Rigaku Denki Co., Ltd.). The results are shown in FIG. 9.

In such X-ray diffraction patterns, the solid lines show the laminates of polymer film and metal film, and the dotted lines show composites after said laminates were maintained at 120° C. for 10 minutes in the isothermal bath. According to this figure, in any patterns shown by solid lines the diffraction peaks of their respective metal and nylon 11 appear, revealing the construction made by laminating metal evaporated film and the polymer layer of nylon 11. In each pattern shown by dotted lines, the diffraction peak width (half-value width) of each metal is large, demonstrating that each metal has been changed into fine grains and are dispersed in nylon 11.

When copper was used, copper was changed into $Cu_2O$ (copper oxide), the fine grains of which were found to be dispersed in nylon 11.

EXAMPLE 3

Next, a polymer layer was formed on a glass plate by varying the vacuum evaporation speed of nylon 11 and then laminating with metal (gold) evaporated film to produce samples, each of which was in turn maintained at 120° C. for 10 minutes to obtain a polymer composite. Table 2 displays the vacuum evaporation speed of nylon 11 and the state of the fine-grained gold in the polymer composite.

TABLE 2

| Evaporation speed | Presence of metal dispersion | State of dispersion | State of nylon 11 | Thickness of nylon 11 (μm) |
| --- | --- | --- | --- | --- |
| 50 nm/min | yes | heterogeneous | wax-like | 5 |
| 130 nm/min | yes | homogeneous | film-like | 5 |
| 800 nm/min | yes | homogeneous | film-like | 5 |
| 2000 nm/min | yes | homogeneous | film-like | 5 |
| 1500 nm/sec | yes | homogeneous | film-like | 20 |

In accordance with the above results, when the evaporation speed of nylon 11 was as low as 5 nm/min, gold formed fine grains were dispersed in the polymer layer but were heterogeneously. In addition, at this evaporation speed the polymer layer of nylon 11 took a wax-like state and exhibited adhesiveness.

EXAMPLE 4

The next study was made to determine whether metal fine grains would penetrate into the polymer layer due to the effect of the ground. In the same manner as in the previous EXAMPLE 1, first sample, the polymer layer of nylon 11 was produced on various grounds by the evaporation method with gold film further applied thereon by the evaporation method. The polymer layer and film were maintained at 100° C. for 30 minutes in the isothermal bath. The coloration of the polymer layer and the size of gold fine grains penetrating into the polymer layer were measured with the transmission electron microscope. The results are shown in Table 3.

These results reveal that the diffusion and penetration by gold fine grains into the polymer layer took place without being effected by the material used as the ground.

TABLE 3

| | Embodiment | | | | |
| --- | --- | --- | --- | --- | --- |
| | 4-1 | 4-2 | 4-3 | 4-4 | 4-5 |
| Ground | Glass | ITO Glass | KCl single crystal | gold plate | polypropylene film |
| Color of film | clear and red | clear and red | clear and red | clear and red | clear and red |
| Grain size of metal (mm) | 1–10 | 1–10 | 1–10 | 1–10 | 1–10 |

EXAMPLE 5

The effects of the metals used was then studied using samples produced by the previously described method of EXAMPLE 1. A polymer layer of nylon 11 was first produced on each glass ground by the evaporation method, followed by laying the thin layers of various metals thereon by the evaporation method to produce the samples. After maintaining the samples at 100° C. for 30 minutes in the isothermal bath, the coloration of the polymer layer and the size of the fine grains of each metal or metal oxide penetrating into the polymer layer were measured with the transmission electron microscope. The results are shown in Table 4.

TABLE 4

| | Embodiment | | | | | |
| --- | --- | --- | --- | --- | --- | --- |
| | 5-1 | 5-2 | 5-3 | 5-4 | 5-5 | 5-6 |
| Metal | gold | silver | iron | zinc | cerium | copper |
| Color of film | clear and red | clear and yellow | clear and dark yellow | clear and dark yellow | clear and red yellow | clear and yellow green |
| Grain size of metal or metal oxide (nm) | 1–10 | 1–10 | 1–100 | 1–100 | 1–10 | 1–20 |

According to the above data, there occurred the diffusion and penetration by metals or metal oxides into the polymer layer irrespective of the kinds of metals.

Figure 10:
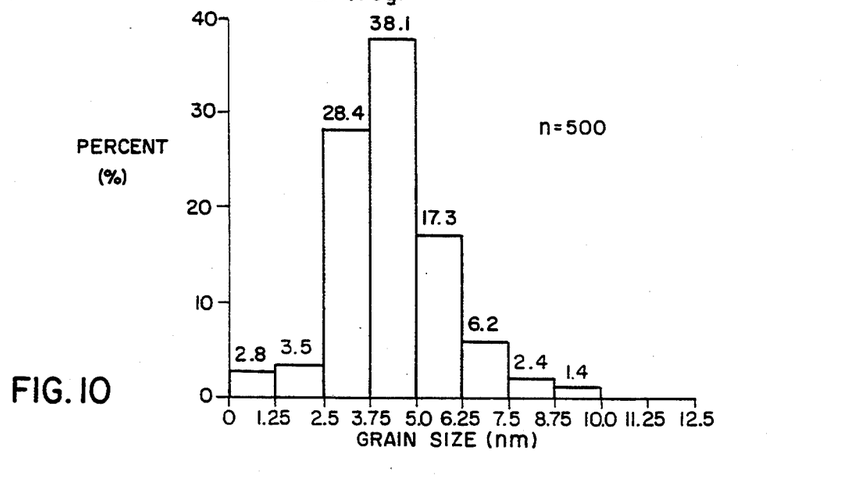
FIG. 10 is a diagram showing the grain size distribution of gold fine grains which are dispersed in a polymer composite.
Figure 11:
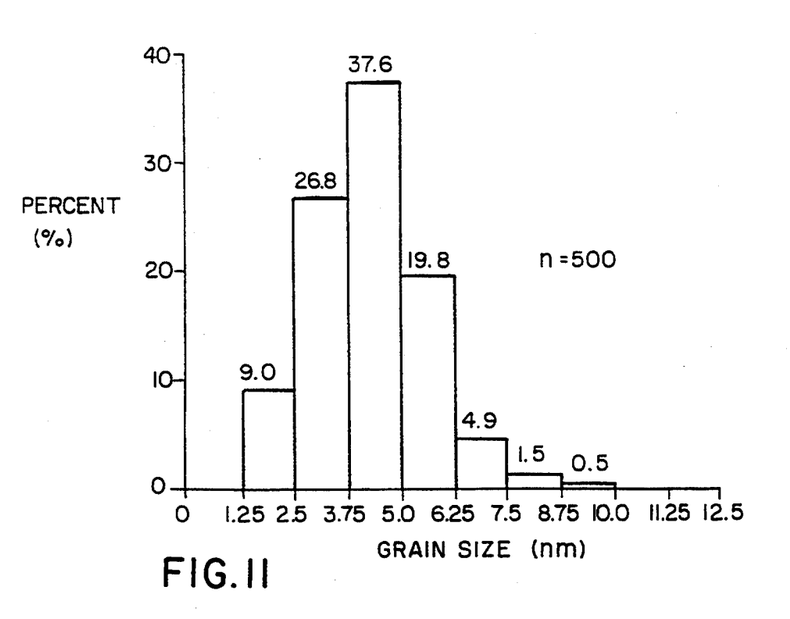
FIG. 11 is a diagram showing the grain size distribution of silver fine grains which are dispersed in a polymer composite.
Figure 12:
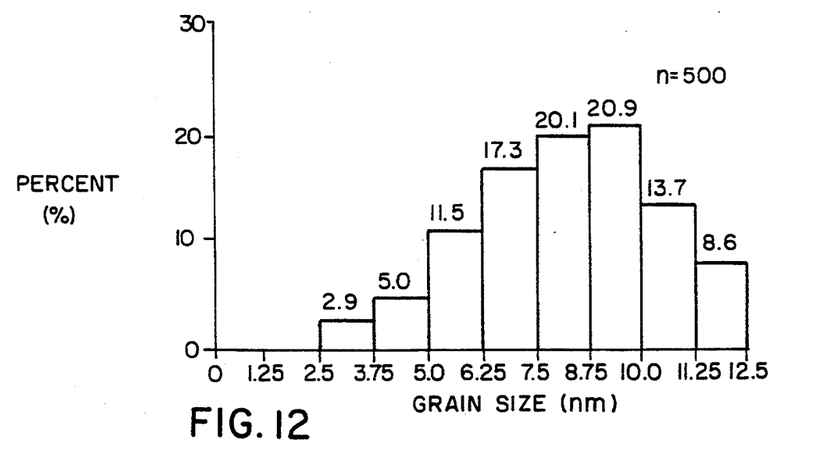
FIG. 12 is a diagram snowing the grain size distribution of copper oxide fine grains which are dispersed in a polymer composite.

In addition, the grain size distribution of the fine grains of gold, silver and copper oxide, respectively, was observed from the transmission electron microphotographs, the results being shown in FIG. 10 (gold fine grains), FIG. 11 (silver fine grains), and FIG. 12 (copper oxide fine grains).

These results show that the average grain sizes of gold and silver, respectively, are smaller than that of copper oxide.

EXAMPLE 6

Each kind of polymer was put into the space formed by two glass plates and a thickness-adjusting spacer placed between said glass plates, left in an isothermal bath for melting, and immediately put into liquid nitrogen for rapid cooling and solidification, thus leading to the production of a film-like, thermodynamically nonequilibrium polymer layer with a thickness of about 10 to about 100 μm. Then, gold was vacuum-evaporated into the polymer layer in the same manner as in EXAMPLE 1, resulting in a laminated film which was maintained at 100° C. for 30 minutes in the isothermal bath.

The state of coloration of the above-mentioned polymer layer after heating and the grain size of gold fine grains were examined. The results are shown in Table 5.

The production of polymer layers in the comparative examples was performed by cooling the polymers, which were melted in the isothermal bath, slowly at room temperature. The metal film was applied by the vacuum evaporation method as in this EXAMPLE.

Thus, metal fine grains were also diffused and penetrated into polymer layers obtained by the method of rapidly solidifying the polymers melted.

TABLE 5

| | Embodiment | | | | Comparative example | | | |
| --- | --- | --- | --- | --- | --- | --- | --- | --- |
| | 6-1 | 6-2 | 6-3 | 6-4 | 6-1 | 6-2 | 6-3 | 6-4 |
| Polymer | nylon 11 | nylon 12 | nylon 69 | HDPE | nylon 11 | nylon 12 | nylon 69 | HDPE |
| Metal | gold | gold | gold | gold | gold | gold | gold | gold |
| Color of film after heating | clear and red | clear and red | clear and red | clear and dark red | clear and white | clear and white | clear and white | clear and white |
| Grain size of metal (nm) | 1–10 | 1–10 | 1–10 | 1–100 | — | — | — | — |

EXAMPLE 7

Like in the previous EXAMPLE 1, the polymer layers of nylon 11 and nylon 12, respectively, were produced on a glass ground by the vacuum evaporation method and, moreover, the polymer layers of nylon 11 and nylon 12, respectively, were produced on a glass ground by rapidly cooling and solidifying them with liquid nitrogen as in EXAMPLE 6. For these samples, the polymer layers were laid on top of another so as to face each other, and with foil with a thickness of 0.2 μm allowed to lie between these polymer layers, a pressure of 1 kg/cm$^{-2}$ was placed on the glass ground to have the gold foil adhere to the polymer layers.

After each of the above samples was maintained at 100° C. for one hour in the isothermal bath, the coloration of the polymer layer and the grain size of metal fine grains penetrating into the polymer layer were measured with the transmission electron microscope. The results are shown in Table 6.

In the comparative examples, the same measurements were made using the film obtained by melting and slow cooling.

TABLE 6

| | Embodiment | | Comparative example | |
| --- | --- | --- | --- | --- |
| | 7-1 | 7-2 | 7-1 | 7-2 |
| Polymer | nylon 11 | nylon 12 | nylon 11 | nylon 12 |
| Metal | gold | gold | gold | gold |
| Color of film after heating | clear and red | clear and red | clear and white | clear and white |
| Grain size of metal (nm) | 1–10 | 1–10 | — | — |

It is understood that metal fine grains were also diffused and penetrated into the polymer layer by the method of sticking metal foil directly onto the polymer layer.

EXAMPLE 8

The next description will be made about an EXAMPLE of this invention using the polymer composite as a bonding material.

First, a bonding material was obtained by the same method as that in EXAMPLE 2, using a polymer composite with gold fine grains dispersed in 10 vol % in nylon 11 and a polymer composite with 18 vol % Cu$_2$O dispersed in nylon 11 and which are taken off from the ground glass plate.

After the above material was laid on one bonded area (40 mm × 10 mm) of a stainless steel plate that was 60 mm long, 10 mm wide and 0.1 mm thick, the bonding material was melted by heating and then applied to the whole surface with another stainless steel plate laid on the first plate. Next, this was sandwiched between two iron plates with a thickness of 5 mm, and the four corners were screwed at a clamping torque of 40 kilogrammeter (kg-m), followed by heating at a predetermined temperature of Table 7 for 10 minutes to have the two stainless steel plates bonded to each other.

The bonding material used in the comparative EXAMPLE 8-1 had gold grains with an average grain size of 0.5 to 2 μm dispersed in 50 wt % in liquid paraffin. The bonding material used in the comparative EXAMPLE 8-2 had copper grains with a mean grain size of 10 to 20 μm dispersed in 50 wt % in liquid paraffin.

The bonding strength of the stainless steel plates thus obtained was measured with a tension tester. The results, in kilograms, are shown in Table 7. Furthermore, by polishing the bonded surface of each taken off stainless steel plate, the existence of a substance on said polished surface was confirmed from a peak of X-ray diffraction obtained by the thin film X-ray diffraction method with an angle of incidence of 0.5°, thus allowing the study of whether the metal in the bonding material caused metalizing. Table 8 shows the results.

TABLE 7

| | | | | (kg) |
| --- | --- | --- | --- | --- |
| | Embodiment | | Comparative example | |
| | 8-1 | 8-2 | 8-1 | 8-2 |
| Bonding | Nylon 11 | Nylon 11 | gold grain/liquid | copper grain/liquid |

TABLE 7-continued

| | | Embodiment | | Comparative example | (kg) |
| --- | --- | --- | --- | --- | --- |
| | | 8-1 | 8-2 | 8-1 | 8-2 |
| material | | gold fine grain 10 vol % | $Cu_2O$ fine grains 18 vol % | paraffin | paraffin |
| Heating tempera-ture | 700° C. | 40 | 40 | failure | failure |
| | 750° C. | 45 | 30 | failure | failure |
| | 800° C. | 45 | 55 | failure | failure |
| | 900° C. | — | 66 | failure | failure |

TABLE 8

| Heating temperature (°C.) | Embodiment 8-1 | | | Embodiment 8-2 | | | | |
| --- | --- | --- | --- | --- | --- | --- | --- | --- |
| | Metallizing Yes or No | X-ray diffraction peak | | Metallizing Yes or No | X-ray diffraction peak | | | |
| | | Au | Nylon 11 | | Cu | $Cu_2O$ | CuO | Nylon 11 |
| 700 | ○ | ○ | x | x | x | x | ○ | x |
| 750 | ○ | ○ | x | ○ | ○ | ○ | ○ | x |
| 800 | ○ | ○ | x | ○ | ○ | ○ | ○ | x |
| 900 | ○ | ○ | x | ○ | ○ | Δ | Δ | x |

Note: among X-ray diffraction peaks,
x: not present
Δ: little present
○: present According to the above results, the polymer composite in accordance with this invention can be fully used as a bonding material because nylon 11 is decomposed and evaporated during heat treatment, leading the metal to provide metalizing on the stainless steel plate.

EXAMPLE 9

A method of sticking a polymer composite of this invention onto a bonded material was studied next. In this EXAMPLE, a polymer composite with 18 vol % $Cu_2O$ dispersed in nylon 11 was stuck, by the same vacuum evaporation method as in EXAMPLE 2, to a polymer composite with 18 vol % $Cu_2O$ dispersed in nylon 11 obtained in EXAMPLE 8 (which was taken off in a film shape from the ground glass plate). A paste product was obtained by dissolving the polymer composite in methacresol at a weight ratio of 1:1, and applying the paste to the surface of a bonded material, thus leading to bonding of stainless steel plates to each other in the same way as in EXAMPLE 8. Furthermore, heat treatment was performed at 700° C. for 10 minutes.

The bonding strength of the stainless steel plates obtained in the above manner and the adequacy of metalizing on the stuck surface was studied. The results are shown in Table 9.

TABLE 9

| | Embodiment | | |
| --- | --- | --- | --- |
| | 9-1 | 9-2 | 9-3 |
| Bonding material | film | paste | evaporated onto surface of bonded material |
| Bonding strength (kg) | 37 | 34 | 37 |
| Adequacy of metallizing | ○ | ○ | ○ |

Thus, the polymer composite in accordance with this invention can be fully applied regardless of the form of the sticking material.

EXAMPLE 10

It was demonstrated that a polymer composite relating to this invention has photoelectric effect enabling photo energy to be converted into electrical energy.

Figure 13:
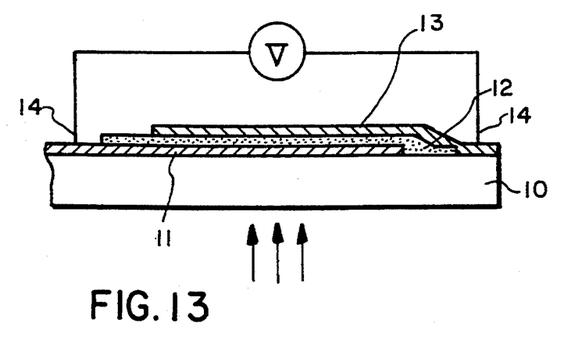
FIG. 13 is a diagram to explain a measuring method of photoelectric effect in EXAMPLE 10.

Samples, as shown in FIG. 13, were prepared by the following process. First, a glass substrate 10 (ITC glass, Central Glass Co., Ltd.) with the thin film 11 of indium tin oxide (ITC) laminated to the glass substrate 10 was placed in a vacuum evaporator, followed by lamination of a polymer composite 12 to said ITC by the same method as in EXAMPLE 2; then, it was again placed in the vacuum evaporator for lamination of the aluminum evaporated film 13 with a thickness of about 0.2 μm to the surface of the polymer composite 12, and terminals 14 and 14, respectively, were taken out from the aluminum evaporated film 13 and the thin film 11 of ITC, thus enabling the measurement of voltage.

The above-mentioned samples were irradiated with a 50 W halogen lamp at a light irradiation area of 1 cm² from one side of the glass substrate 10, photoelectromotive force and its build-up (variation speed immediately after light irradiation) were measured. The results are shown in Table 10.

In the comparative examples, nylon 11 in bulk, germanium evaporated film, silicon evaporated film, and nylon 11 evaporated film were used as substitutes for the polymer composite.

TABLE 10

| | | Sample for measurement | Thickness of sample for measurement | Maximum photo-electromotive force (mV) | Build-up (mV/sec) |
| --- | --- | --- | --- | --- | --- |
| Embodiment 10 | 1 | Au-nylon 11 | 5 μm | 157 | 2.1 |
| | 2 | Cu-nylon 11 | 5 μm | 265 | 6.0 |
| | 3 | Ge-nylon 11 | 5 μm | 260 | 48.0 |
| | 4 | Si-nylon 11 | 5 μm | 160 | 155.0 |
| Comparative | 1 | nylon 11 in bulk | 100 μm | 0 | — |
| | 2 | Ge evaporated film | 2000 μm | 10 | 23.5 |

TABLE 10-continued

|  | Sample for measurement | Thickness of sample for measurement | Maximum photo-electromotive force (mV) | Build-up (mV/sec) |
| --- | --- | --- | --- | --- |
| example 10 | 3 Si evaporated film | 2000 μm | 4 | 22.0 |
|  | 4 Nylon 11 evaporated film | 5 μm | 130 | 0.6 |

Thus, in a polymer composite in accordance with this invention, its electromotive force is found to increase, coupled with a raise in its variation speed, compared with the comparative examples upon exposure to light irradiation possessing sufficient photoelectric effect.

We claim:

1. A polymer composite comprising a thermoplastic polymer in a thermodynamically equilibrated state and fine grains of at least one metal or metal oxide dispersed and separated from each other within the thermoplastic polymer, the fine grains having a grain size of about 1,000 nanometers or less, the fine grains being dispersed and separated by relaxation of a solid thermoplastic polymer layer from a thermodynamically nonequilibrated state having a metal or metal oxide layer on a surface of the thermoplastic polymer layer to the thermodynamically equilibrated state.

2. The polymer composite in accordance with claim 1 wherein the grain size is about 300 nanometers or less.

3. The polymer composite in accordance with claim 1 wherein the grain size is about 100 nanometers or less.

4. The polymer composite in accordance with claim 1 wherein the fine grains are selected from the group consisting of gold, silver, platinum, copper, iron, zinc, cerium and oxides thereof.

5. The polymer composite in accordance with claim 1 wherein the thermoplastic polymer is selected from the group consisting of nylons, high density polyethylenes, low density polyethylenes, poly(vinylidene fluorides), poly(vinyl chlorides), and polyoxymethylenes.

6. The polymer composite in accordance with claim 1 wherein the metal or metal oxide layer is being deposited on the thermoplastic layer at a rate of at least about 50 nanometers per minute.

7. The polymer composite in accordance with claim 6 with the metal or metal oxide layer being deposited at a rate of about 130 to about 2,000 nanometers per minute.

8. A method for manufacturing a polymer composite comprising the steps of:
providing a substrate;
forming a layer of solid thermoplastic polymer in a thermodynamically nonequilibrated state by vacuum evaporation on the substrate;
applying a metal or metal oxide layer to the surface of the polymer layer, the metal or metal oxide layer being capable of forming fine grains of the metal or metal oxide in the solid polymer layer; and
relaxing the polymer layer at a temperature less than the melting temperature of the polymer to maintain the polymer layer in a solid, non-molten state to achieve thermodynamic equilibrium of the polymer layer and disperse the fine grains in the solid polymer layer, the fine grains being of about 1,000 nanometers or less in size.

9. The method in accordance with claim 8 wherein the metal or metal oxide layer is applied at a thickness that results in substantially all of the metal or metal oxide layer being dispersed in the polymer layer upon relaxation.

10. The method in accordance with claim 8 wherein the metal or metal oxide layer is applied to the polymer layer by a vacuum evaporation method.

11. The method in accordance with claim 8 wherein the step of applying the metal or metal oxide layer is performed at a rate of at least about 50 nanometers per minute.

12. The method in accordance with claim 11 wherein the metal or metal oxide layer is applied at a rate of about 130 to about 2,000 nanometers per minute.

13. The method of claim 8 wherein the relaxing step is performed at a temperature greater than the glass transition temperature of the polymer.

14. A polymer composite made in accordance with the method of claim 8.

15. A method of manufacturing a polymer composite of fine metal or metal oxide grains dispersed in a thermoplastic polymer, the method comprising the steps of:
forming a solid thermoplastic polymer layer in a thermodynamically nonequilibrated state by melting and immediate solidification;
applying a metal or metal oxide layer to the surface of the thermoplastic polymer layer, the metal or metal oxide layer being capable of forming fine grains in the solid polymer layer; and
relaxing the thermoplastic polymer layer at a temperature less than the melting temperature of the polymer to achieve thermodynamic equilibrium of the thermoplastic polymer layer and disperse the fine grains in the solid plastic layer, the fine grains having a size of about 1,000 nanometers or less.

16. The method in accordance with claim 15 wherein the metal or metal oxide layer is applied at a thickness that results in substantially all of the metal or metal oxide layer being dispersed in the polymer layer upon relaxation.

17. The method in accordance with claim 15 wherein the step of applying the metal or metal oxide layer is performed at a rate of at least about 50 nanometers per minute.

18. The method in accordance with claim 17 wherein the metal or metal oxide layer is applied at a rate of about 130 to about 2,000 nanometers per minute.

19. A polymer composite made in accordance with the method of claim 17.

* * * * *